Oct. 5, 1926.

Re. 16,436

R. B. MARSCHKE

SASH BALANCE AND WEATHER STRIP

Original Filed April 20, 1921

Inventor
Reinhold B. Marschke
By his Attorneys
Wm. Maurice Kilgore

Reissued Oct. 5, 1926.

Re. 16,436

UNITED STATES PATENT OFFICE.

REINHOLD B. MARSCHKE, OF FARGO, NORTH DAKOTA.

SASH BALANCE AND WEATHER STRIP.

Original No. 1,411,445, dated April 4, 1922, Serial No. 462,838, filed April 20, 1921. Application for reissue filed July 26, 1923. Serial No. 654,026.

This invention relates to a sash balance and weather strip device, and has for its object the construction of a simple and efficient device for eliminating the usual weights of window sashes, and the provision of means for permitting ready adjustment of a sash within a window frame and at the same time affording an efficient weather strip for preventing drafts of cold air from entering a room between the window frame and sash, or sashes.

With this and other objects in view, my invention comprises certain novel combinations, constructions and arrangements of parts as will be hereinafter described, illustrated in the accompanying drawings, and more particularly pointed out in the appended claims.

Figure 1:
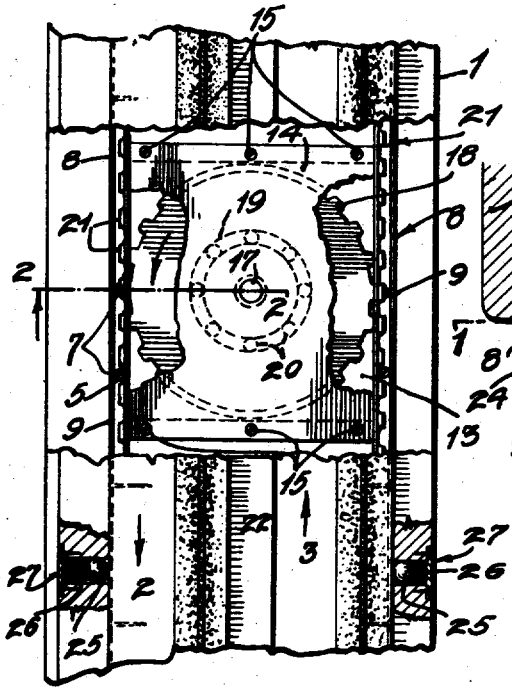
Figure 1 is a fragmentary view of a window frame and two sashes therein, showing my invention partly in section and partly in elevation; the view being taken partly on line 1—1 of Fig. 2, looking in the direction of the arrows.

Referring to the drawings by numerals, 1 designates the window frame in which are positioned sashes 2 and 3. The structure is the same on both sides of the window frame so that it will only be necessary to describe one side, as the other side is duplicated. In the window frame 1 is formed a vertically extending groove 4, and fastened in groove 4, by screws 5, is a U-shaped guide strip 6; the screws 5 may be placed in position through apertures 7 of the substantially U-shaped gear strip 8.

Figure 2:
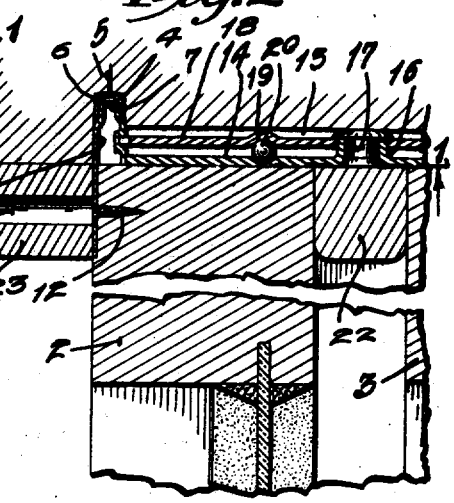
Figure 2 is a sectional view, taken on line 2—2 of Fig. 1, and looking in the direction of the arrows.
Figure 3:
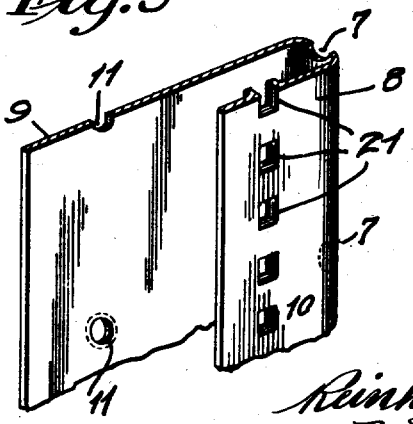
Figure 3 is a fragmentary, sectional, perspective view of one of the gear strips.

The gear strips 8 are each provided with a comparatively broad, outer side 9 and a comparatively narrow, inner side 10. In the outer side 9 are formed apertures 11, through which extend screws 12 for fastening the gear strip 8 permanently to a sash, Fig. 2.

A compartment 13 is formed in the window frame 1, and a cover plate 14 is fastened by screws 15, over the compartment 13. This cover plate is provided with an inwardly extending, integral hub 16, and in this hub 16 is stub shaft 17. Mounted on the hub 16 is a cogwheel 18. A race-way 19 is formed upon the cover plate 14 and the cogwheel 18, and ball-bearings 20 are placed in the race-ways 19. The inner side 10 of each of the gear strips 8 is provided with inwardly punched sockets 21, in which the cogs of cogwheel 18 travel.

A dividing strip 22 is placed between the sashes 2 and 3, and window strips 23 are placed against the sashes for holding the sashes in position within the frame 1. Window strips 23 may be apertured, as at 24, for permitting the screws 12 to be inserted therethrough and placed in the sash, as clearly shown in Fig. 2.

It sometimes occurs that one sash is heavier than another sash, or the sashes slide too freely, and for such reasons I provide a brake device including ball 25, bearing directly against the sash, spring 26 and retaining plate 27; the plate 27 keeps the spring in position, causing an inward pressure at all times upon the ball 25, holding the ball in frictional contact with the sash and braking the sash.

It is to be understood that in a set of two sashes, four gear strips will be used, with two cogwheels 18 meshing with these strips, and that upon raising or lowering either sash, both sashes will be adjusted, and upon removing the operator's hands from the sashes, they will normally be retained in the position that the operator leaves same. Further, the placing of the U-shaped guide strips 6 in the grooves 4, and having the inner ends of the gear strips frictionally engaging these guide strips 6, will produce tight weather strips, as well as a slight, frictional braking action, further assisting in producing a very efficient device, as a whole.

The ball-bearings 20 assist in making the structure very easy to operate by overcoming frictional resistance between the cover plates and the cogwheels.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

An important feature of my invention is the provision of combined gear strips and weather strips; that is, strips or elements which, in themselves, perform the double function and which eliminate the necessity for separate or additional weather strips. My invention makes it possible to use, for example, a single pressed metal strip having rack-forming perforations for engagement with the cogwheel and for extending said single strip directly from the window sash into the groove formed therefor in the window frame, thereby efficiently accomplishing the said double function, and at the very smallest possible cost.

What I claim is:

1. In a device of the class described, the combination of a window frame provided with a vertically extending groove, a U-shaped guide strip in the inner end of said groove, a sliding sash within said window frame, a substantially U-shaped gear strip in said groove and engaging said guide strip, said gear strip provided with an outer, broad side resting against the outer face of the sash, means detachably fastening the outer, broad side of the gear strip to the sash, and a cogwheel on said window frame and engaging said gear strip.

2. In a device of the class described, the combination with a window frame provided with a groove and a compartment, a slidable sash in said window frame contiguous to said groove and compartment, a cogwheel in said compartment, a substantially U-shaped gear strip in said groove and bearing against the outer face of the sash, a window strip disposed against the frame and sash, screws fastening the gear strip to the sash, a guide strip in the groove behind the gear strip, screws fastening the guide strips in the groove, and said gear strip provided with apertures adapted to register with the last mentioned screws of the guide strip.

3. The combination with a window frame and upper and lower window sashes mounted to slide vertically in said frame, of combined gear and weather strips secured to the respective sash and having portions folded upon themselves and extended into the vertical grooves provided therefor in said frame and frictionally engageable with said frame, and a cog wheel journaled in said window frame and engaging, at diametrically opposite sides, the inner folds of the said weather strips and causing the one sash to counterbalance the other.

4. The combination with a window frame and upper and lower window sashes mounted to slide vertically in said frame, of combined gear and weather strips secured to the respective sash and having portions folded upon themselves and extended into the vertical grooves provided therefor in said frame and frictionally engageable with said frame, and a cog wheel journaled in said window frame and engaging, at diametrically opposite sides, the inner folds of the said weather strips and causing the one sash to counterbalance the other, the outer folds of said strips being overlapped with and secured to the respective sash.

In testimony whereof I hereunto affix my signature.

REINHOLD B. MARSCHKE.